Dec. 17, 1929. A. J. HAND 1,739,757
MAKING WELDED SPIRAL PIPE
Filed April 3, 1928
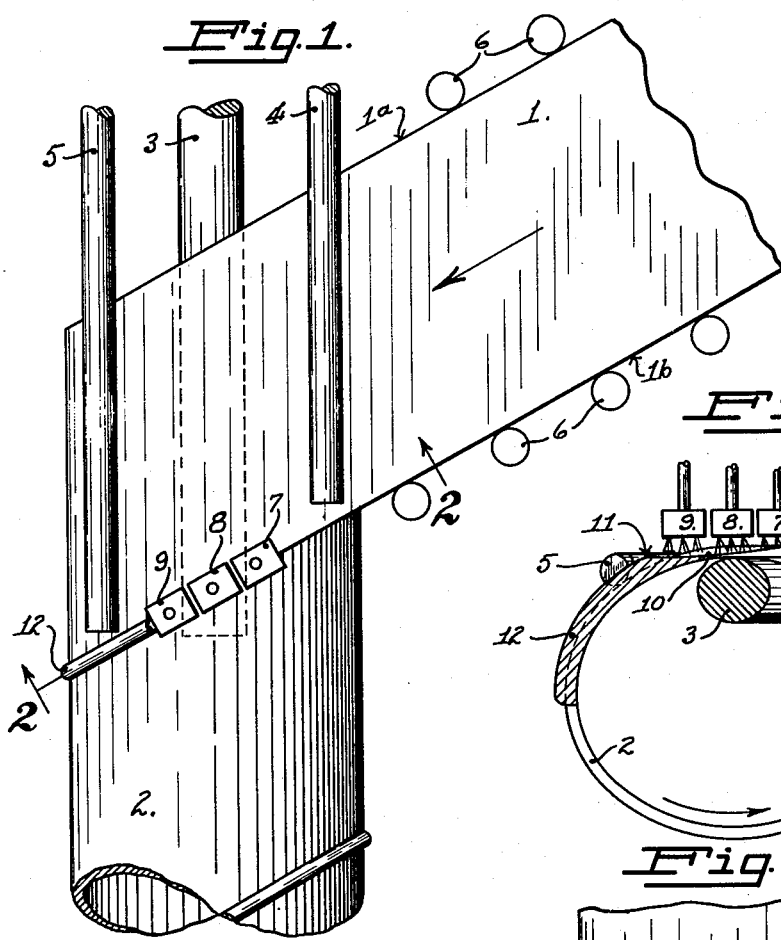
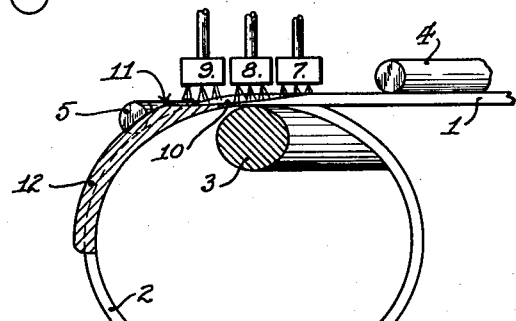
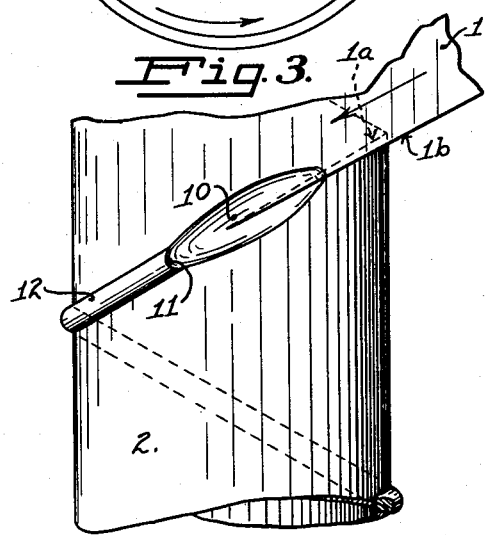
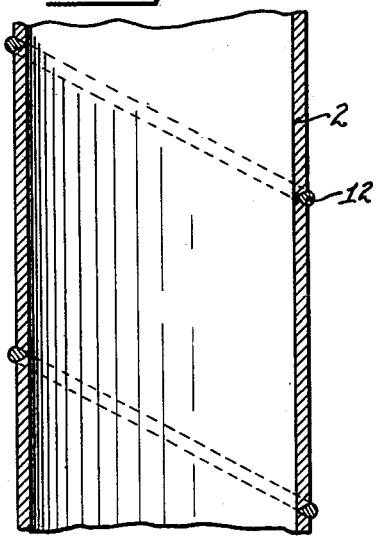
INVENTOR.
Augustin J. Hand
BY Booth + Booth
ATTORNEYS.

Patented Dec. 17, 1929

1,739,757

UNITED STATES PATENT OFFICE

AUGUSTIN J. HAND, OF BERKELEY, CALIFORNIA, ASSIGNOR TO CALIFORNIA CORRUGATED CULVERT CO., OF BERKELEY, CALIFORNIA, A CORPORATION OF CALIFORNIA

MAKING WELDED SPIRAL PIPE

Application filed April 3, 1928. Serial No. 266,899.

The present invention relates to the art of making welded spiral pipe. Its principal object is the same as that expressed in the pending application of Augustin J. Hand, Serial No. 226,879, filed October 18th, 1927, viz:—to provide a welded seam, of greater thickness than the adjacent metal, which can be made simply and rapidly without the addition of extra metal from an outside source.

The advantages of spiral welded pipe are well known. It can be made by a continuous process, in lengths limited only by practical considerations of subsequent handling. The production of a welded seam of greater thickness than the adjacent metal is also of great advantage, not only in insuring a seam or joint having a strength equal to or greater than the strength of the metal itself, but also in providing a helical rib around the pipe which adds considerably to its strength and stiffness.

By employing the principles of the present invention, a raised or thickened spiral weld can be made rapidly and successfully, upon pipe made from metal of any thickness which can be wound into spiral form and welded, without the addition of any extra metal from an outside source. The invention, therefore, permits the use of a gas or atomic welding process, although other processes of fusion welding may be used.

The invention, and a suitable apparatus for carrying it out, will be described in the following specification, which should be read with the understanding that the several steps of the process may be varied, within the limits of the claims hereto appended, and that the said apparatus is described merely as an example of any suitable means for carrying out said process.

Reference should be had to the accompanying drawings, wherein:—

Fig. 1 is a plan view indicating a simple apparatus for winding a sheet helically into the form of a pipe, showing the relative positions of the winding means and the welding means, and showing also the completed weld.

Fig. 2 is an enlarged diagonal section taken on the line 2—2 of Fig. 1, showing the application of the invention to the welding of the pipe.

Fig. 3 is an enlarged plan view of the pipe in process of being welded, the winding and welding means being removed for the sake of clearness.

Fig. 4 is a longitudinal section of the finished pipe showing the thickened weld.

In the drawings, the reference numeral 1 designates the sheet of metal which is wound helically into tubular form to make the pipe 2. Inasmuch as any suitable means may be employed for the winding operation, I have merely indicated, in Figs. 1 and 2, three rollers 3, 4, and 5, the roller 3 lying inside the pipe and the rollers 4 and 5 being outside and acting to bend the sheet 1 over said roller 3. Guide rollers 6 are also indicated to direct the sheet 1 into the bending rollers 3, 4, and 5 at the proper angle. Any suitable means, not shown, may be employed for feeding the sheet 1 forwardly into said bending rollers.

The welding means is positioned above the point at which the rear edge $1^a$ of the sheet meets the forward edge $1^b$, and its flame is directed downwardly. The inner bending roller 3 is preferably long enough to underlie this point. The welding means may be of any suitable form capable of heating the meeting edges of the sheet for a distance extending from the point at which they first come into contact to a point somewhat beyond the vertical central plane of the pipe. As one example of such welding means, there are shown three separate gas torches, 7, 8 and 9, although a single torch of approximately the same length may be used.

The position and characteristics of the flame of the torch or torches are so adjusted that it melts the meeting edges of the sheet and forms an elongated crater as shown at 10 in Figs. 2 and 3. This crater extends beyond the vertical center of the pipe, so that the molten metal flows forwardly and piles up as shown at 11, cooling in the form of a raised or thickened weld 12, the cross section of said weld being shown in Fig. 4.

The contraction of the metal in cooling draws the edges of the sheet together, so that the rear edge $1^a$ underlies the forward edge 1ᵇ before said edges come together, as shown in Fig. 3. The formation of the crater 10, however, eats away enough of said edges to prevent them from overlapping so that they come together in the same plane. Thus the raised or thickened weld is formed from metal which comes from the edges of the sheet. It is essential, of course, that the finished portion 2 of the pipe be permitted to issue freely from the machine, in order to permit the contraction of the cooling weld to draw the edges together. Any suitable means, not shown, may be provided for supporting the pipe 2 in such a manner that its free endwise movement is not restricted.

It will be apparent that the proper control of the welding flame is essential to the success of the process. The flame must heat the edges of the sheet sufficiently before they come together to permit the formation of the crater 10 at the point of contact of said edges, and said crater must extend sufficiently beyond the vertical center of the pipe to permit the molten metal to flow downwardly and forwardly to pile up into the thickened weld. The crater must not be so extensive as to permit the molten metal to drop through to the inside of the pipe. The relatively cool roller 3 forms a backing for the crater and the hottest portion of the weld and permits a thin crust of non-fluid metal to remain on the inside of the pipe as a bottom for the crater.

The use of three separate torches or welding instrumentalities permits a more perfect control of the flame, although the process may be carried out successfully with only one of sufficient length. By using three, however, the characteristics of the successive portion of the flame can be varied slightly, permitting greater speed and more positive results. Thus for example, the flame of the welder 7, which initially heats the metal, may have reducing characteristics to avoid excessive oxidation, the flame of the central welder 8, which forms the crater, may have more oxidizing effect, and the flame of the last welder 9 may be similar to the first, with a slight reducing effect.

Having thus described the invention, what is claimed is:—

1. The process of welding spiral pipe, which consists in heating to melting temperature the adjacent edges of a sheet wound helically into tubular form, forming a crater in the molten metal, supporting the inner surface of the metal opposite said crater, and causing the molten metal from said crater to flow into a thickened weld uniting said edges.

2. The process of making spiral pipe, which consists in winding a sheet helically into tubular form with its opposite edges approaching each other in potential overlapping relation, heating said edges to melting temperature before overlapping occurs, and causing the molten metal to flow into a thickened weld uniting said edges.

3. The process of welding spiral pipe, which consists in initially heating the adjacent edges of a sheet wound helically into tubular form by a flame having reducing characteristics, melting the heated metal and forming a crater therein by a subsequent flame having oxidizing characteristics, and causing the molten metal from said crater to flow into a thickened weld uniting said edges.

4. The process of welding spiral pipe, which consists in initially heating the adjacent edges of a sheet wound helically into tubular form by a flame having reducing characteristics, melting the heated metal and forming a crater therein by a subsequent flame having oxidizing characteristics, and causing the molten metal from said crater to flow into a thickened weld uniting said edges, while subjected to a third flame having reducing characteristics.

In testimony whereof I have signed my name to this specification.

AUGUSTIN J. HAND.